May 16, 1961   C. C. CHRISTIANSON   2,984,218
FLUID PRESSURE MODULATING SERVO VALVE
Filed July 29, 1958
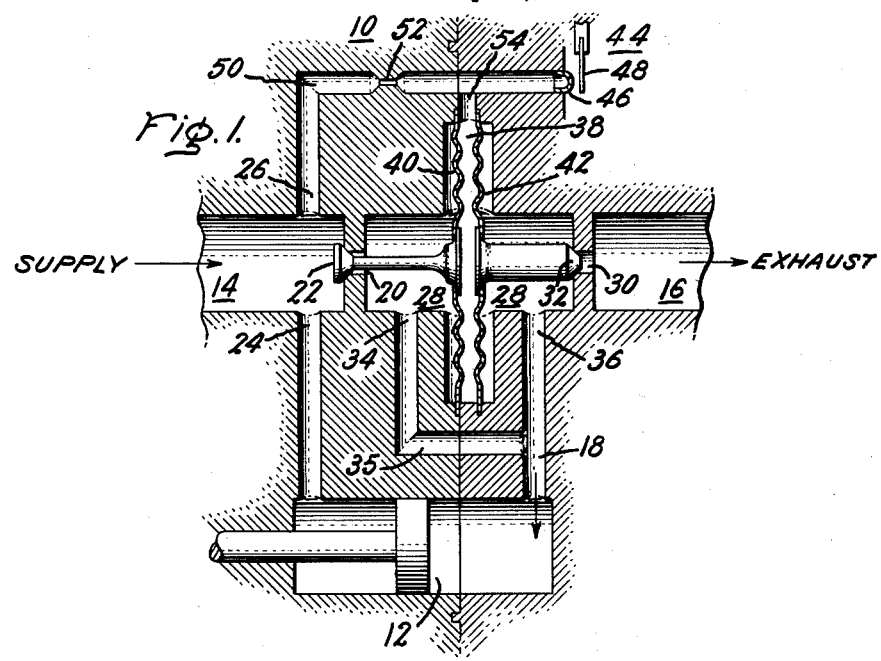
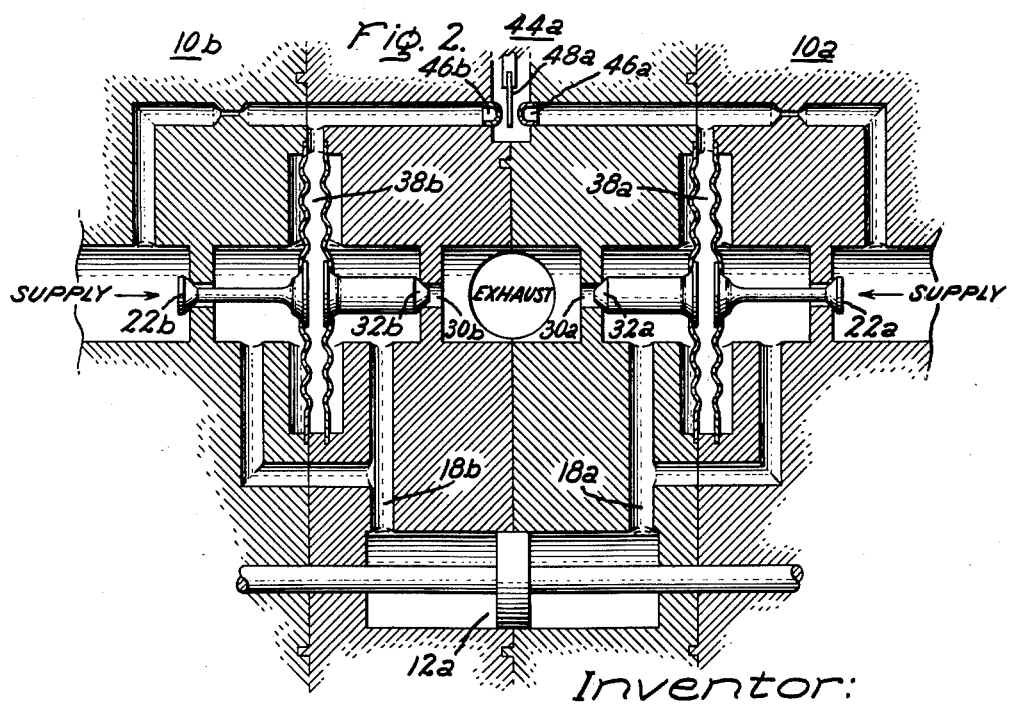
Inventor:
Clinton C. Christianson,
by Francis K. Doyle
His Attorney.

United States Patent Office 2,984,218
Patented May 16, 1961

2,984,218
FLUID PRESSURE MODULATING SERVO VALVE

Clinton C. Christianson, West Peabody, Mass., assignor to General Electric Company, a corporation of New York Filed July 29, 1958, Ser. No. 751,670

7 Claims. (Cl. 121—46.5)

This invention relates to a fluid pressure servo valve and more particularly to a fluid pressure servo valve which may be used in pneumatic or hydraulic continuous control systems.

Present day fluid control systems generally utilize a hydraulic fluid which is limited to a 300° F. to a 500° F. range. This range has been adequate for a number of years in fluid control systems for aircraft. However, present day supersonic aircraft use control systems which are operating at the very top of the temperature range of hydraulic fluids which are utilized today. With the development of supersonic aircraft presently on the drafting boards, the use of control systems which will operate at a much higher temperature is a definite requirement. Since no present day hydraulic fluid will operate in this high temperature region, which is considered to extend to 1000° F. and higher, it is becoming increasingly desirable to go to a fluid control system which utilizes a gas. Since with gas there is no temperature limitation on the control fluid, it appears that pneumatics is the solution for a control system which can operate in 1000° F. environment. At added advantage obtained in the use of high pressure pneumatics to replace hydraulics is that it will provide an over-all weight reduction and eliminate the fire hazards of hydraulic oils.

High pressure pneumatics has not been used in aircraft for continuous or proportional control for applications such as flight control surfaces because of any one or all of three major deficiencies. First, most servo valves have incorporated in them sliding surfaces which generate significant friction forces due to the relatively poor lubricating properties of a gas. These friction forces lower the valve sensitivity and cause poor performance.

The second deficiency of previous systems has been the continual leakage of the servo valve and actuator. A gas compressor large enough to supply sufficient gas for such leaky systems would be impractical for most aircraft applications. The continual gas leakage is the result of the finite clearance required between sliding surfaces of previous valves. In some cases, in order to minimize friction, the valve has been designed to use an air film between the sliding surfaces. The result is an even greater increase in leakage and a prohibitive power loss.

The third deficiency of previous systems is the result of the low bulk modulus of a gas compared with hydraulic fluids. The low bulk modulus of a gas creates a stability problem because of the relatively low frequency of the pneumatic resonance of the actuator and load. In the null position of the valve, the volume of compressible gas entrained in the actuator acts as spring. This pneumatic spring in conjunction with any mass load causes the load and actuator to have a lightly damped resonant frequency commonly known as the pneumatic resonance. Under some system characteristics, sustained oscillations of the actuator and load can result due to the presence of this pneumatic resonance. One investigator has determined that the stability of the system can be improved by adding a considerable amount of damping to the pneumatic resonance. Damping was obtained by connecting a dead ended volume to each servo line through a capillary. However, for aircraft applications such damping devices have the serious disadvantage of adding considerable weight and volume.

From the above it is clear that to fill the need of a practical pneumatic control system, especially for use in aircraft application, a new type of servo valve is necessary. Extensive study and tests have shown that many of the above problems can be eliminated by the use of a "pressure" control valve instead of the flow control valve used in most hydraulic systems.

It is, therefore, an object of this invention to provide a servo valve for use in a pneumatic system which will have negligible fluid leakage.

It is another object of this invention to provide a servo valve which is insensitive to friction by eliminating sliding parts in the valve.

It is a further object of this invention to provide a valve construction which is simple to assemble and contains a limited number of precision parts.

A further object of this invention to provide a servo valve, the output pressure of which is continuously controllable as a function of an input signal, which makes possible direct control of an output force.

In carrying out this invention in one form a servo valve is provided which operates as a pressure control valve. This pressure control valve comprises inlet means, including an inlet port, adapted to be connected to a high pressure fluid supply source, outlet means for supplying fluid pressure to a device to be controlled, and valve means adapted to be actuated to provide a flow of fluid from the supply to the outlet. An exhaust port is also provided, for exhausting undesired pressure. Control means are provided for controlling the opening of the inlet port and the exhaust port. This control means operates on a variable restriction whereby the pressure of the fluid flow at the variable restriction determines the control pressure applied to an extensible device which is attached to the valve means controlling flow through the inlet port and the exhaust port. The extensible device and valve assembly is so designed that the control pressure must be slightly greater than the output pressure in order to open the inlet valve while the control pressure must be slightly less than the outlet pressure in order to open the exhaust valve.

This invention and the manner in which its objects and advantages are obtained, will be better understood from the following description taken in connection with the accompanying drawings wherein:

Figure 1 is a schematic diagram of a servo pressure valve constructed in accordance with this invention;

Figure 2 is a schematic diagram of a servo pressure valve constructed in accordance with this invention showing an arrangement which may be used when it is desired to control the differences between two pressures.

Referring now to the drawing wherein like numerals are used to indicate like parts throughout and in particular with reference to Figure 1, this invention in one form is shown as comprising a pressure servo valve generally designated 10 which is adapted to provide continuous control of a load, such as for example, the piston and cylinder 12. The valve 10 is provided with an inlet opening 14 adapted to be connected to a source of fluid, an exhaust opening 16 for carrying excess fluid back to the source and an outlet 18 for providing control fluid to the cylinder means 12. Means are provided at the inlet 14 and the exhaust 16 of the pressure valve 10 to allow fluid to enter into and be exhausted from the pressure valve. These means are controlled by a control means which directly controls the inlet and exhaust ports and thereby controls the amount of fluid allowed to flow from the outlet 18 to actuate the piston and cylinder 12. More specifically, the inlet 14 of the servo pressure valve 10 is provided with an inlet port 20, the port 20 being opened and closed by means of a valve, such as for example, poppet valve 22. The inlet 14 is also provided with a port 24 which is adapted to provide fluid to one end of the piston and cylinder device 12 when the pressure valve 10 is operating to exhaust fluid from the opposite end thereof by means of outlet port 18. A third port 26 is provided at inlet 14 for providing control pressure to servo pressure valve 10 for controlling its operation in a manner which will shortly be described. Within the servo pressure valve 10 is provided a pressure chamber 28, which is filled from the inlet port 20 and which is adapted to be exhausted through an exhaust port 30. The exhaust port 30 is controlled by a valve means such as for example, poppet valve 32. Pressure chamber 28 is also provided with outlet ports 34 and 36, the port 34 being adapted to provide fluid flow to outlet 18 to thereby control the movement of the piston and cylinder device 12 in one direction, whereas the port 36 is adapted to allow fluid pressure to be relieved from one end of the piston and cylinder device 12 through port 18, port 36 and out through exhaust port 30.

The pressure chamber 28 of the servo pressure valve 10 is divided by means of expansible members such as for example, diaphragms 40, 42, which form between them a control chamber 38. As clearly appears from Figure 1, one end of inlet poppet valve 22 is attached to one diaphragm 40, while one end of exhaust poppet valve 32 is attached to the other diaphragm 42. A by-pass, formed between ports 34 and 36 by channel 35, is provided to equalize the pressure within divided pressure chamber 28. Control pressure is supplied to the interior of the diaphragms 40, 42 designated as control chamber 38, such that, when the control pressure is greater than the pressure within chamber 28, diaphragm 40 will expand thereby forcing outlet poppet valve 22 to move to the left as shown in Figure 1. Movement of poppet valve 22 opens inlet port 20 and allows fluid to flow from inlet port 20 through outlet port 34 down through outlet port 18, thereby actuating piston and cylinder device 12 causing it to move to the left. When the pressure within chamber 28 builds up sufficiently to overcome the control pressure within the diaphragms, inlet poppet valve 22 will be closed and the movement of piston and cylinder device 12 will cease. Conversely, when the control pressure within the diaphragms 40, 42 becomes less than the pressure within pressure chamber 28, the diaphragm 42 will be caused to collapse, thereby opening exhaust poppet valve 32 and allowing fluid to be exhausted through exhaust port 30. This will allow fluid to be exhausted from the right hand portion of the piston and cylinder device 12 through outlet port 18, port 36 and pressure chamber 28 and out through exhaust port 30, thus allowing the piston and cylinder device 12 to move to the right. Fluid pressure is supplied to the left hand side of cylinder 12 through port 24. As the pressure within pressure chamber 28 becomes less diaphragm 42 will expand slightly thereby closing exhaust port 30 with exhaust poppet valve 32 and thus movement of the piston and cylinder device 12 to the right is halted.

It should be noted that means are provided in conjunction with the diaphragms 40, 42 such that when the control pressure in control chamber 38 is greater than the pressure in pressure chamber 28 only diaphragm 40 expands to any extent. Conversely, when pressure in control chamber 38 is lower than the pressure in pressure chamber 28, only diaphragm 42 will be collapsed. These means are provided by the design of the poppet valves 22, 32. Inlet poppet valve 22 is so designed, as clearly shown in Figure 1, so that when inlet port 20 is closed, further collapse of diaphragm 40 is prevented. In a similar manner, when exhaust poppet valve closes exhaust port 30, further expansion of diaphragm 42 is prevented.

The pressure within the control chamber 38 is controlled by means of a variable restriction device, generally designated 44. In the preferred embodiment shown in the drawing, the variable restriction device 44 comprises a nozzle 46 and a flapper valve 48. Fluid is supplied to nozzle 46 by means of the inlet 14 to servo valve 10 through the port 26 and fluid supply line 50. The fluid supply line 50 is provided with a fixed restriction 52. A flow channel 54 is provided connecting the flow conduit 50 with the control chamber 38. The freedom of flow of the fluid through variable restriction 44 will determine the pressure built up within control chamber 38. Thus by means of nozzle 46 and flapper 48 the control pressure within chamber 38 can be varied as desired. For example, when flapper 48 moves closer to nozzle 46, the flow of fluid through nozzle 46 is impeded, thereby increasing the fluid pressure within flow conduit 50 between the restriction 52 and the nozzle 46, which increases the fluid pressure within chamber 38 through the connecting flow channel 54. Conversely, as flapper 48 is moved away from nozzle 46 the fluid is allowed to more freely flow through nozzle 46, thereby lowering the pressure within flow conduit 50 between the restriction 52 and nozzle 46 and thus lowering the pressure within chamber 38. It will appear obvious to those skilled in the art, that flapper 48 can be actuated by a low power signal consisting of either a mechanical motion or a pressure signal. The mechanical motion can be obtained from either an electrical signal or a force signal by the use of proper devices such as solenoid or springs. The method of connecting flapper 48 to be actuated by an input signal can be in any desired manner.

From the above description the operation of the valve 10 should be apparent. As flapper 48 is moved closer to nozzle 46 it produces a greater restriction to flow out from the nozzle. As a result, the control pressure in the control chamber 38 will tend to increase, thereby producing a movement of the inlet poppet valve 22 which opens the inlet port 20. The inlet poppet valve 22 will seek to open port 20 such that the outlet pressure through outlet port 34 and 18 will be approximately equal to the control pressure. The amount of the opening required will depend on the flow requirement. If no steady state flow is required the inlet poppet valve will again close when the outlet pressure equals the control pressure. If the flapper 48 were to move away from nozzle 46 it would produce a reduction in the control pressure resulting in the closing of the inlet poppet valve 22 and the opening of the exhaust poppet valve 32 so as to maintain the output pressure equal to the control pressure. From this it can be seen that the output pressure is continuously controlled by means of the control pressure within chamber 38 and obviously, the control pressure is a function of the input signal which is utilized to actuate flapper 48.

Figure 2 is an example of a servo pressure valve made in accordance with one form of this invention which is adapted to be utilized in instances where it is desired to provide positive double ended action to an actuator such as for example the double ended piston and cylinder unit 12a. The right hand portion of piston and cylinder unit 12a is provided with fluid through port 18a from a valve 10a while the left hand end of the unit 12a is provided with fluid through a port 18b by operation of valve 10b. The operations of valves 10a and 10b is similar to that previously described for pressure servo valve 10. In this instance a variable orifice or restriction 44a is provided cooperating with each of valves 10a and 10b. In the preferred embodiment shown, the variable restriction 44a is shown as comprising a flapper 48a operating in conjunction with nozzle 46a of valve 10a and nozzle 46b of valve 10b. As flapper valve 48a is moved closer to nozzle 46a, it produces a greater restriction to flow out of the nozzle 46a. Thus control pressure is built up within control chamber 38a, thereby causing poppet valve 22a to open and allowing fluid to flow down through port 18a to the right hand side of cylinder and piston unit 12a. At the same time that flapper 48a is moved closer to nozzle 46a it also moves away from nozzle 46b thereby producing a reduction in the control pressure within the control chamber 38b. This reduction in control pressure within chamber 38b causes inlet poppet valve 22 to be closed and exhaust poppet valve 32b to be opened, thereby allowing fluid to be exhausted from the left hand side of piston and cylinder unit 12a through port 18b and exhaust port 30b of valve 10b. Thus movement of flapper valve 48a toward nozzle 46a will produce a movement of the piston and cylinder unit 12a to the left. Obviously, opposite action will occur when flapper 48a is moved closer to nozzle 46b. With such movement of flapper 48a the piston and cylinder unit 12a would be caused to move to the right. Thus by means of a piston flapper 48a the orifice of both valve 10a and 10b can be varied in an opposite manner thereby providing positive action of the double ended piston and cylinder unit 12a in either direction.

The pressure valve herein described is specially designed for use in a high pressure pneumatics system. However, it will be obvious to those skilled in the art that it may also be applied to hydraulic systems to great advantage, such as for example, the elimination of friction in the servo valve.

While there has been shown and described a preferred embodiment of the preferred form of this invention it is obvious that various changes or substitutions may be made by those skilled in the art. For example, it is obvious that variable orifice 44 and 44a may be provided by means other than nozzle 46 and flappers 48. Various other changes will occur to those skilled in the art. Thus the embodiment shown and described is considered as descriptive only, the scope of the invention being set forth in the appended claims.

What is claimed as new, and which is desired to secure by Letters Patent of the United States is:

1. A pressure control valve for controlling fluid pressure from a fluid supply source to an actuator device comprising, an inlet means, including an inlet port, adapted to be connected to a source of fluid, an exhaust port, an outlet port adapted to be connected to an actuator, a pressure chamber within said pressure control valve, valve means for controlling said inlet and said exhaust ports, an extensible means dividing said pressure chamber, bypass means around said extensible means to equalize the pressure within said divided pressure chamber on both sides of said extensible means, said extensible means being inter-connected with said valve means, and variable means for controlling movement of said extensible means whereby said valve means are controlled to determine the fluid available to said outlet port.

2. A pressure control valve for controlling fluid pressure from a fluid supply source to an actuator device comprising, an inlet means, including an inlet port, adapted to be connected to a source of fluid, an exhaust port, adapted to return fluid to its source, an outlet port adapted to be connected to an actuator, a pressure chamber within said pressure control valve and including said inlet port, said exhaust port and said outlet port, valve means for controlling said inlet and said exhaust ports, an extensible means dividing said pressure chamber, said extensible means forming a pressure control chamber within said pressure chamber, means equalizing the pressure in said pressure chamber on both sides of said pressure control chamber, said valve means being operatively connected to said control chamber and a variable pressure means for controlling pressure within said pressure control chamber, the operative relation between said pressure chamber, said pressure control chamber and said valve means being such, that when the pressure within said pressure control chamber exceeds the pressure within said pressure chamber said inlet port is opened and said exhaust port is closed, and, when the pressure within said pressure control chamber is less than the pressure within said pressure chamber, said inlet port is closed and said exhaust port is opened whereby the amount of fluid available to said outlet port is controlled.

3. A pressure control valve for controlling fluid pressure from a fluid supply source to an actuator device, the pressure control valve comprising, an inlet means, including an inlet port, adapted to be connected to a source of fluid, an exhaust port adapted to return fluid to its source, an outlet port adapted to be connected to an actuator for supplying the actuator with fluid, a pressure chamber formed within said pressure control valve and including said inlet port, said exhaust port and said outlet port, means for controlling said inlet and exhaust ports, extensible means dividing said pressure chamber, bypass means around said extensible means to equalize the pressure within said divided pressure chamber on both sides of said extensible means, means interconnecting said controlling means and said extensible means, a variable orifice means, means joining said variable orifice means and said extensible means for actuating said extensible means according to variations in said variable orifice means, whereby said controlling means are moved by said extensible means according to variations in said variable orifice to thereby control the flow of fluid from said outlet port.

4. In a pressure control valve, an inlet means, including an inlet port, adapted to be connected to a source of fluid, an exhaust port, an outlet port adapted to be connected to an actuator device, a pressure chamber formed in said pressure control valve, means for controlling said inlet and exhaust ports, a pressure control chamber mounted within said pressure chamber, means to equalize pressure within said pressure chamber around said pressure control chamber, said control chamber being operatively connected to said controlling means, and variable pressure means for controlling the pressure within said pressure control chamber, whereby the flow of fluid from said outlet port may be controlled.

5. In a pressure control valve, a pressure chamber operatively connected to a fluid source, inlet, outlet and exhaust ports operatively connected with said pressure chamber, whereby fluid flow through said inlet and exhaust ports determines the fluid flow in said outlet port, a pressure control chamber mounted in said pressure chamber, means to equalize pressure within said pressure chamber around said pressure control chamber, variable pressure means for controlling the pressure within said pressure control chamber, control means for controlling the fluid flow in said inlet and exhaust ports, and means interconnecting said control means and said pressure control chamber, whereby variations in pressure within said pressure control chamber varies the fluid flow in said inlet and exhaust port.

6. A pressure control valve for controlling fluid pressure from a fluid supply source to an actuator device comprising, a pressure chamber, inlet means adapted to connect a fluid supply source to said pressure chamber, outlet means adapted to connect said pressure chamber to an actuator device for supplying fluid to said actuator device, exhaust means for exhausting pressure from said pressure chamber, control means for controlling fluid flow in said inlet and exhaust means, a pressure control chamber mounted in said pressure chamber, said pressure control chamber dividing said pressure chamber, bypass means to equalize pressure within said pressure chamber on both sides of said pressure control chamber, means operatively connecting said pressure control chamber with said control means, a variable pressure means for controlling the pressure within said pressure control chamber whereby variations of pressure within said pressure control chamber operates said control means to control fluid flow in said inlet and said exhaust means to thereby control fluid flow in said outlet means.

7. A pressure control valve for controlling fluid pressure from a fluid supply source to an actuator device comprising, a pair of pressure chambers, each pressure chamber having an inlet means, an outlet means, and an exhaust means, each said inlet means being adapted to connect a fluid supply source to each said pressure chamber, each of said outlet means being adapted to connect each said pressure chamber to opposite sides of an actuator device for actuation of said actuator device, control means mounted in each said pressure chamber for controlling the inlet means and exhaust means of each said pressure chamber, extensible means dividing each said pressure chamber, said extensible means forming a pressure control chamber within each said pressure chamber, each said pressure control chamber being operatively connected to said control means mounted in each said pressure chamber, and a variable pressure device operatively connected to both said pressure control chambers for oppositely varying the pressure in said pressure control chambers to thereby provide controlled fluid flow adapted to actuate said actuator device.

References Cited in the file of this patent

UNITED STATES PATENTS

| | | |
|---|---|---|
| 2,061,898 | De Motte | Nov. 24, 1936 |
| 2,825,354 | Du Bois | Mar. 4, 1958 |
| 2,835,262 | Brandstadter | May 20, 1958 |
| 2,836,154 | Lantz | May 27, 1958 |
| 2,861,550 | Hanna | Nov. 25, 1958 |
| 2,884,905 | Jensen | May 5, 1959 |